United States Patent [19]

Snaper

[11] 4,304,132
[45] Dec. 8, 1981

[54] WATER DETECTION DEVICE

[76] Inventor: Alvin A. Snaper, 2800 Cameo Cir., Las Vegas, Nev. 89107

[21] Appl. No.: 62,249

[22] Filed: Jul. 30, 1979

[51] Int. Cl.³ ............................................. G01F 23/22
[52] U.S. Cl. ................................ 73/304 R; 340/620; 73/61.1 R
[58] Field of Search ........................ 73/304 R, 61.1 R; 75/134 B; 204/195 R; 340/620

[56] References Cited

U.S. PATENT DOCUMENTS

| | | | |
|---|---|---|---|
| 2,910,940 | 11/1959 | Colman | 340/620 |
| 3,102,301 | 9/1963 | Dechene | 73/304 R |
| 3,131,335 | 4/1964 | Berglund | 340/620 |
| 4,107,997 | 8/1978 | Snaper | 73/304 R |

Primary Examiner—Gerald Goldberg
Assistant Examiner—Denis E. Corr
Attorney, Agent, or Firm—Donald D. Mon

[57] ABSTRACT

A device for detecting the presence of water in a fuel tank comprising a fitting mounted at the lower most portion of said tank having a water sensing alloy on said fitting. The fitting positions the water sensing alloy in the tank in the position where water will tend to collect. The fitting also includes a socket for connecting an indicating device such as an ammeter to determine the presence of water in the tank. The length by which the fitting extends into the tank can be used to determine the depth of water in the tank and when the amount of water collected at the bottom or sump of the tank exceeds a predetermined depth it will be detected by the indicator connected externally to the water sensing alloy. A useful water sensing alloy is comprised of a composition of lead, tin, and zinc each being present in an amount of between about 20–45% by weight, with the composition also containing small amounts of up to about 0.1% of copper and/or up to about 1% of either samarium, ruthenium, vanadium or selenium.

4 Claims, 2 Drawing Figures

WATER DETECTION DEVICE

BACKGROUND OF THE INVENTION

This invention relates to devices for detecting and removing water which may contaminate fuel in storage tanks.

The presence of water in gasoline and other fuels can, if it is drawn into the fuel supply system cause serious problems. For example in internal combustion engines, especially for aircraft, water can cause serious engine malfunction, and even stall the engine. For this reason, many fuel tanks, and all aircraft fuel tanks, are provided with sump drains for draining water from the tanks. The water collects at the bottom, because it is immisible and its specific gravity is greater than that of gasoline. The technique is usually to open a petcock and drain some liquid from the tank. If only gasoline flows out (and this can be observed by its color), the valve is closed. If only water is withdrawn, flow is continued until gasoline leaves the valve. Then the valve is closed. In both situations, gasoline is wasted, and usually drips on the ground, and often onto the mechanic or pilot. This is wasteful, messy, and hazardous. It would be advantageous to open the drain only if there were water present, and some times only if excessive water were present. Then the valve would not be opened unnecessarily. Because of the volatility of the gasoline, it is very desirable that a voltage not be applied to a test circuit to determine the presence or absence of water. Instead, the device should be self-generating, and passive relative to the gasoline.

SUMMARY OF THE INVENTION

The purpose of the present invention is to determine and detect the presence of water in fuel storage tanks, and if desired to indicate approximately the amount of water in the tank.

The invention makes use of an alloy which has the property of generating an electrical current when in contact with water. The alloy is attached to the end of a fitting mounted at the lower most portion of the fuel tank where water will collect. Optionally, it can be arranged so as to indicate the depth or amount of water which has collected in the tank. The fitting passes through the base or wall of the tank, and includes a socket for external connection of an indicating device to respond to the current produced by the water sensing alloy. The indicating device is preferably an ammeter connected as taught in U.S. Pat. No. 4,107,997. Said patent discloses an alloy of different composition which generates a current when contacted by water.

Preferably, the fitting on which the water sensitive alloy is mounted has a socket for removably connecting a plug to temporarily connect a meter for example an ammeter, to the water sensing alloy. Thus the water level in storage tanks can periodically be checked by simply inserting a plug into the fitting and reading the meter. The lug then can be removed, eliminating the need for a permanent installation and external obstructions. This is particularly advantageous in aircraft fuel tanks where a maintenance mechanic can routinely check all fuel tanks with a plug and a single ammeter in a short period of time, without opening any drain valve unless there is water to be drained out. When the ammeter indicates the presence of water, or of excessive water in the fuel tank, then the drain valve can be opened to drain off the water.

An object of the present invention is to provide a permanently installed water detecting device which can be utilized at will to check for water or excess water without opening the tank.

Above and other features of the invention will become apparent from the following detailed description and the accompanying drawings, in which:

FIG. 1 illustrates, somewhat schematically, a fuel tank with the water detecting device of the invention permanently installed therein; and FIG. 2 illustrates the method of removably connecting an indicating device for detecting water in a fuel storage tank.

DESCRIPTION OF THE PREFERRED EMBODIMENT

Figure 1:
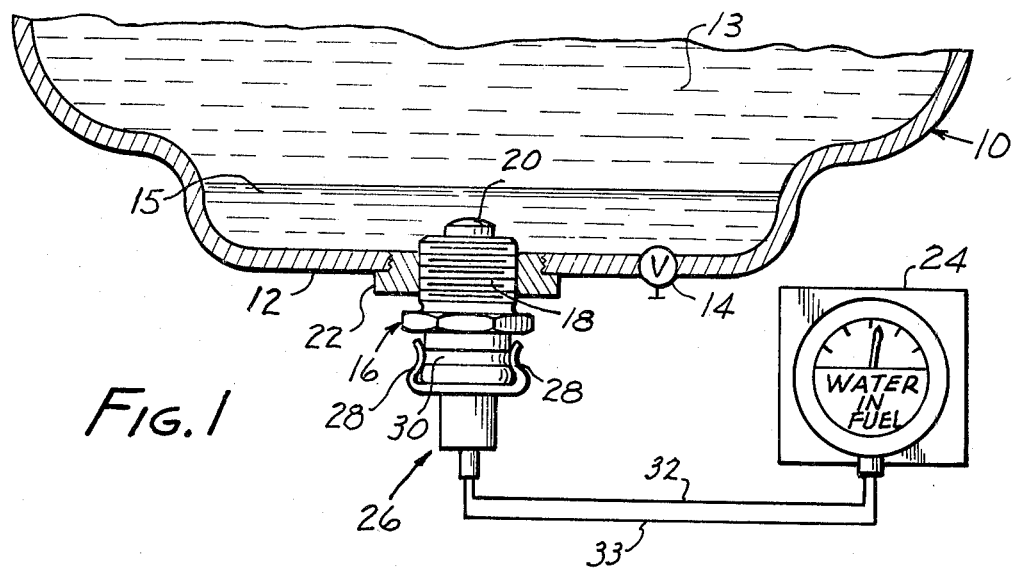

A device for use in a fuel tank to detect water condensed or collected in a tank is illustrated in FIG. 1. A unique advantage of this device is that it excludes any galvanic or outside-the-tank-voltage source. Because of the volatile nature of fuels and extreme danger of explosions the elimination of outside voltage sources can be extremely important for safety reasons.

In FIG. 1, a fuel tank 10 having a sump 12 for collecting water condensing in the fuel is shown. The fuel tank 10 is also provided with the usual drain or bleed valve 14 for draining off undesired liquids 15 such as water in the fuel 13. This draining is accomplished by opening valve 14 and allowing fluid to flow until the fluid flowing appears to be completely fuel. For obvious reasons this is not only wasteful but can be dangerous as well.

To eliminate the need for this trail and error procedure, the water sensing device 16 of the present invention is provided. The water sensing device 16 is comprised of a body 18 having a threaded end. A water sensitive alloy 20 on the end of the body is positioned in the fuel tank 10. The water sensing device 16 is threaded into a fitting 22 that passes through the bottom of the tank at a sump 12. The sump is the lowest point in the tank. Water 15 will collect at this lowermost point, where it will contact alloy 20.

Alloy 20 is a composition which is comprised of lead, tin, and zinc each being present in an amount of between about 20 and about 45% by weight. The composition also contains amounts of up to about 0.1% of copper, and/or up to about 0.1% of samarium, ruthenium, vanadium or selenium, the preferred range being between about 0.001% and 0.1% of said copper and/or of one of said samarium, ruthenium, vanadium or selenium.

The foregoing alloys are similar in nature and function to those described in said Snaper U.S. Pat. No. 4,017,997, and the proportions, methods of compounding, criteria for selection of chemical components, and suitable compounds of samarium, ruthenium, vanadium and selenium are entirely analogous to those described in the said patent, with compounds of samarium, ruthenium, vanadium or selenium substituted for those of tellurium. Therefore, said Snaper patent is incorporated herein by reference in its entirety for its disclosure of the details of a suitable alloy and of how to make it.

The alloy is connected into a two-wire circuit wherein one wire connects to the alloy, and the other connects to the conductive body. The alloy and the body are insulated from one another, and both will be contacted by water when it is present. The wires are in turn connected to terminals (not shown) that are positioned in a socket 25 outside of the tank.

A removable connector 26 carries a spring 28 which can engage in a groove 30 on the body, releasably to hold the connector to the body when a measurement is being made.

Lead 32,33 pass from a coaxial prong assembly 36 on the connection to ammeter 24.

Figure 2:
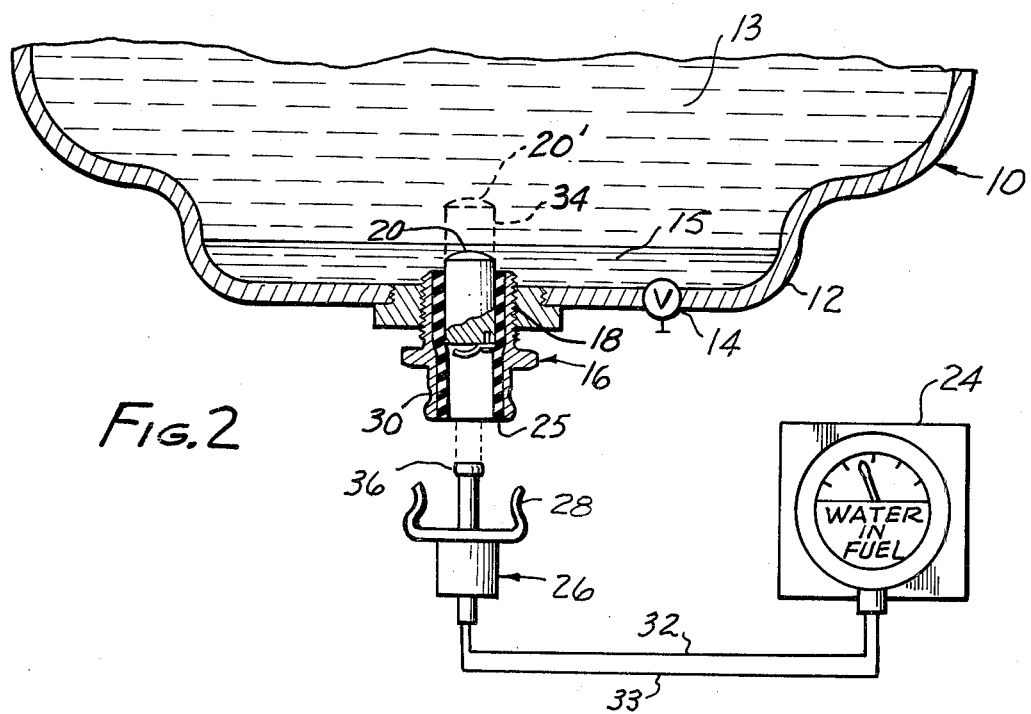

As can be seen in FIG. 2, the water sensing device 16 is installed in fuel tanks for detecting the amount of water collected in the tank. The water collected in the tank can be checked by inserting the prong assembly 36 into the socket of the sensing device 16 and observing the ammeter needle. Thus the permanent installation and use of a meter, or of permanent wiring to a meter is unnecessary.

The presence of water in the tank 10 is determined by the existance of a reading in the ammeter 24. As it happens, the current generated by these alloys is directly proportional to the area contacted by water. If there is no contact, there is no current. If there is contact, then the greater the area of contact, the greater is the current produced. Accordingly, the amount (depth) of water can be read out if the alloy surface is properly positional and proportioned. For example, alloy 20 can be shaped as shown by phantom line 20' with an elongated shape 34. The tubular, vertical wall will have an increasing area contacted by water as the water level rises, and this depth can be read out as a current on the ammeter.

In operation, when one wishes to check for water, or to check the amount of water in the fuel tank, the connector 26 is plugged into the socket, and meter 24 is read. The voltage produced will be constant at approximately ¾ volt, and the current produced by the water sensing alloy will be approximately proportional to the amount of surface area of the alloy provided which is wetted by the water. The alloy is mildly hydrophobic, and will provide an indication on the meter 24 of the amount of water in the tank 10 when configuration 34 is used. If only presence or absence of water is to be determined, the lower profile will be used. When water is to be drained, then valve 14 is opened. However, it is not opened unless the meter reading shows it to be necessary. Thus needless waste of fuel which occurs in the trial and error method of drainage is eliminated.

An alternative to the elongated shape 34 is to place the water sensing device 16 in the tank at some point above the lowermost point, such that when water reaches that level it will contact the sensing alloy 20.

This invention is not to be limited by the embodiments shown in the drawings and described in the description, which are given by way of example and not of limitation, but only in accordance with the scope of the appended claims.

I claim:

1. A device for detecting the presence of water in a fuel tank comprising: a water sensing alloy consisting essentially of between about 20% and 45% each by weight lead, tin and zinc, and between about 0.001% and about 0.1% by weight from the group consisting of copper, samarium, vanadium, and selenium; mounting means comprised of a threaded body threaded into and passing through said tank approximate the lowermost portion of said tank; conductive means connected to said alloy for conducting current generated thereby as a consequence of contact with water; removable connector means for releasably connecting indicating means to said conductive means, said threaded body including a socket exposing said conductive means and an annular groove around the outside of said socket; said connector means including a prong to fit said socket and resilient arms adapted to snap into said annular groove, whereby the presence of water in said tank may be determined.

2. Apparatus according to claim 1 wherein indicating means is connected to said connector means, comprising an ammeter.

3. Apparatus according to claim 1 wherein said body positions said alloy at a predetermined depth in said tank, whereby the presence of water at said depth can be detected.

4. Apparatus according to claim 1 in which said alloy extends vertically in said tank for a substantial distance, whereby the depth of water can be measured as a consequence of area of alloy contacted by water.

* * * * *